US012449106B2

(12) United States Patent
Bhutani et al.

(10) Patent No.: US 12,449,106 B2
(45) Date of Patent: Oct. 21, 2025

(54) VEHICLE HEADLIGHT ASSEMBLY AND SYSTEM WITH HYBRID MATRIX LOW BEAM

(71) Applicant: Autosystems, a division of Magna Exteriors Inc., Aurora (CA)

(72) Inventors: Gaurav Bhutani, Aurora (CA); Seok-Jun Yang, Aurora (CA); Rafat M. Mohammad, Aurora (CA)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

(21) Appl. No.: 18/458,655

(22) Filed: Aug. 30, 2023

(65) Prior Publication Data

US 2024/0102628 A1    Mar. 28, 2024

Related U.S. Application Data

(60) Provisional application No. 63/409,492, filed on Sep. 23, 2022.

(51) Int. Cl.
*F21S 41/663*    (2018.01)
*B60Q 1/14*    (2006.01)
*F21S 41/20*    (2018.01)
*F21W 102/14*    (2018.01)

(52) U.S. Cl.
CPC .......... *F21S 41/663* (2018.01); *B60Q 1/1415* (2013.01); *F21S 41/285* (2018.01); *B60Q 2300/054* (2013.01); *F21W 2102/14* (2018.01)

(58) Field of Classification Search
CPC .......... B60Q 2300/056; B60Q 2300/42; B60Q 2300/23; B60Q 1/14; F21S 41/663; F21S 41/20

See application file for complete search history.

(56) References Cited

U.S. PATENT DOCUMENTS

| 6,906,467 B2 | 6/2005 | Stam |
| 6,951,416 B2 | 10/2005 | Sazuka |
| 7,286,296 B2 | 10/2007 | Chaves |

(Continued)

FOREIGN PATENT DOCUMENTS

| EP | 1964717 A2 | 9/2008 |
| EP | 2306073 A2 | 4/2011 |

(Continued)

*Primary Examiner* — William J Carter
(74) *Attorney, Agent, or Firm* — Dickinson Wright PLLC

(57) ABSTRACT

A headlight assembly for a vehicle includes a foreground light source configured to project light over a first field of view greater than 20-degrees wide, and a spot beam light source that includes a plurality of pixel light sources configured to project light over a second field of view smaller than the first field of view and overlapping the first field of view. The foreground light source and the spot beam light source are operable together in a low-beam mode to generate a combined low-beam projection pattern. A lighting system for a vehicle comprises two headlight assemblies. Each of the headlight assemblies includes: a foreground light source, and a spot beam light source having a plurality of pixel light sources. The lighting system also comprises a controller in communication with the spot beam light sources to communicate pattern data thereto for controlling a cut-off pattern of the light projected therefrom.

20 Claims, 17 Drawing Sheets

(56) References Cited

U.S. PATENT DOCUMENTS

| | | |
|---|---|---|
| 7,581,860 B2 | 9/2009 | Bogner |
| 7,618,171 B2 | 11/2009 | Tessnow |
| 7,815,351 B2 | 10/2010 | Saxena |
| 8,550,677 B2 | 10/2013 | Tsutsumi |
| 8,801,242 B2 | 8/2014 | Hamm |
| 9,117,272 B2 | 8/2015 | Klebanov |
| 9,188,299 B2 | 11/2015 | Fiederling |
| 9,476,558 B2 | 10/2016 | Stefanov |
| 10,005,384 B2 | 6/2018 | Canonne |
| 10,066,799 B2 | 9/2018 | Bhakta |
| 10,173,577 B2 | 1/2019 | Albou |
| 10,208,912 B2 | 2/2019 | Taudt |
| 10,293,740 B2 | 5/2019 | Langkabel |
| 10,295,137 B2 | 5/2019 | Stefanov |
| 10,336,242 B2 | 7/2019 | Canonne |
| 10,344,934 B2 | 7/2019 | Schwaiger |
| 10,388,694 B2 | 8/2019 | Pfeuffer |
| 10,414,327 B2 | 9/2019 | Brede |
| 10,458,616 B2 | 10/2019 | Orisich |
| 10,464,470 B2 | 11/2019 | Ohno |
| 10,480,742 B2 | 11/2019 | Joerg |
| 10,527,246 B2 | 1/2020 | De Lamberterie |
| 10,584,842 B2 | 3/2020 | Park |
| 10,591,130 B2 | 3/2020 | Courcier |
| 10,598,328 B2 | 3/2020 | Stoehr |
| 10,627,069 B2 | 4/2020 | Orisich |
| 10,724,699 B2 | 7/2020 | Zhang |
| 10,793,057 B2 | 10/2020 | Stoehr |
| 10,892,387 B2 | 1/2021 | Pfeffer |
| 10,962,187 B2 | 3/2021 | Feil |
| 10,962,189 B2 | 3/2021 | Niu |
| 11,009,206 B2 | 5/2021 | Hartmann |
| 11,025,873 B2 | 6/2021 | Albou |
| 11,028,993 B2 | 6/2021 | Orisich |
| 11,060,680 B2 | 7/2021 | Niu |
| 11,072,274 B2 | 7/2021 | Egal |
| 11,091,087 B2 | 8/2021 | Bonne |
| 11,092,304 B2 | 8/2021 | Simchak |
| 11,187,392 B2 | 11/2021 | Grotsch |
| 11,193,641 B2 | 12/2021 | Taudt |
| 11,365,858 B2 | 6/2022 | Li |
| 11,607,989 B2 | 3/2023 | Bonne |
| 11,629,831 B2 | 4/2023 | Qiu |
| 2008/0198372 A1 | 8/2008 | Pan |
| 2015/0377442 A1 | 12/2015 | Bhakta |
| 2016/0068098 A1 | 3/2016 | Albou |
| 2017/0088036 A1* | 3/2017 | Roeckl .................. F21S 41/143 |
| 2018/0031200 A1 | 2/2018 | Park |
| 2018/0259156 A1 | 9/2018 | Hechtfischer |
| 2019/0086051 A1 | 3/2019 | Motohashi |
| 2019/0179111 A1 | 6/2019 | Chen |
| 2019/0179116 A1 | 6/2019 | Huang |
| 2019/0248272 A1 | 8/2019 | Goldschmidt |
| 2020/0248882 A1 | 8/2020 | Fischer |
| 2021/0148536 A1* | 5/2021 | Roels .................... F21S 41/143 |
| 2022/0046179 A1 | 2/2022 | Van Der Sijde |
| 2022/0128209 A1 | 4/2022 | Fischer |
| 2022/0290827 A1* | 9/2022 | Kleinkes ............... F21S 41/153 |
| 2023/0144346 A1 | 5/2023 | Almehio |

FOREIGN PATENT DOCUMENTS

| | | |
|---|---|---|
| EP | 4008951 A1 | 6/2022 |
| FR | 3043168 A1 | 5/2017 |
| FR | 3056695 A1 | 3/2018 |
| FR | 3062217 A1 | 7/2018 |
| FR | 3082471 A1 | 12/2019 |
| GB | 2579024 A | 6/2020 |
| JP | 2021121543 A | 8/2021 |
| JP | 2021154879 A | 10/2021 |
| WO | 2016177714 A1 | 11/2016 |
| WO | 2018095718 A1 | 5/2018 |
| WO | 2020008062 A1 | 1/2020 |
| WO | 2022026911 A1 | 2/2022 |

* cited by examiner

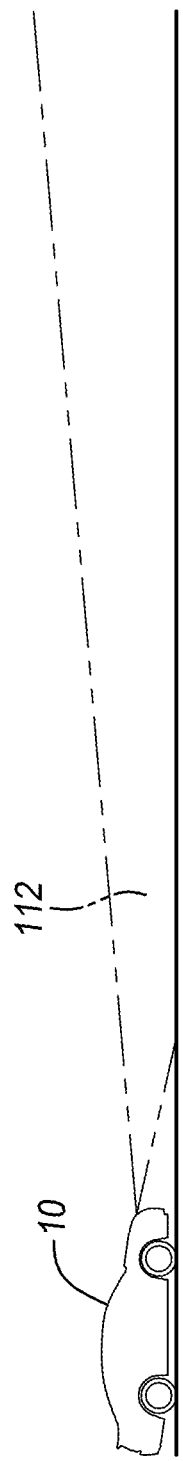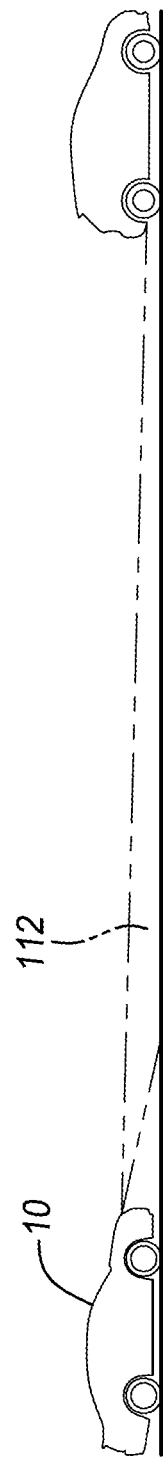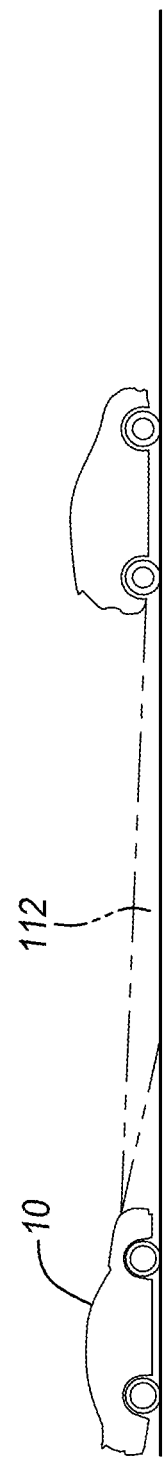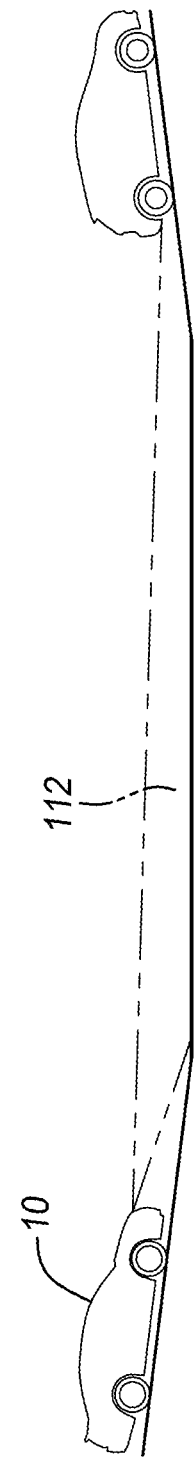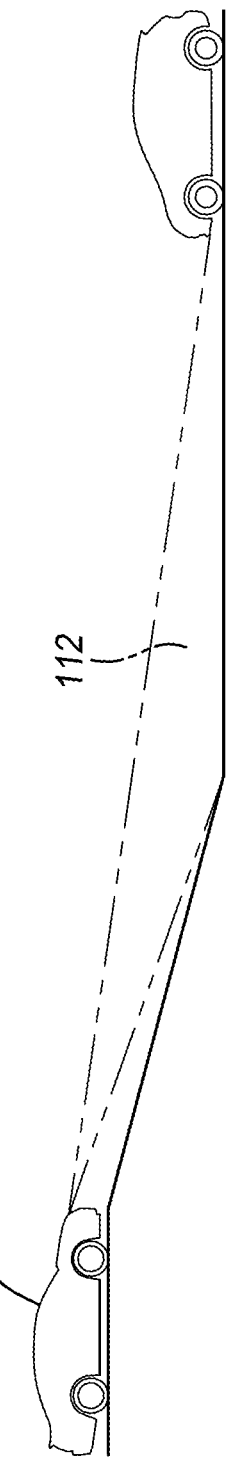

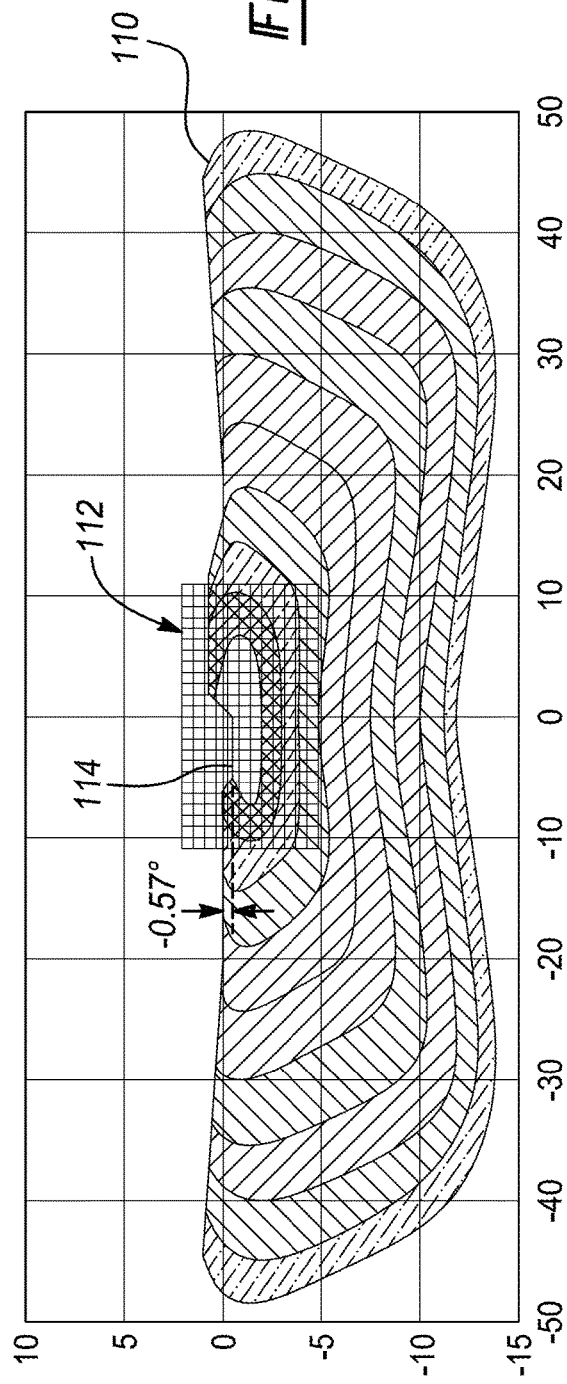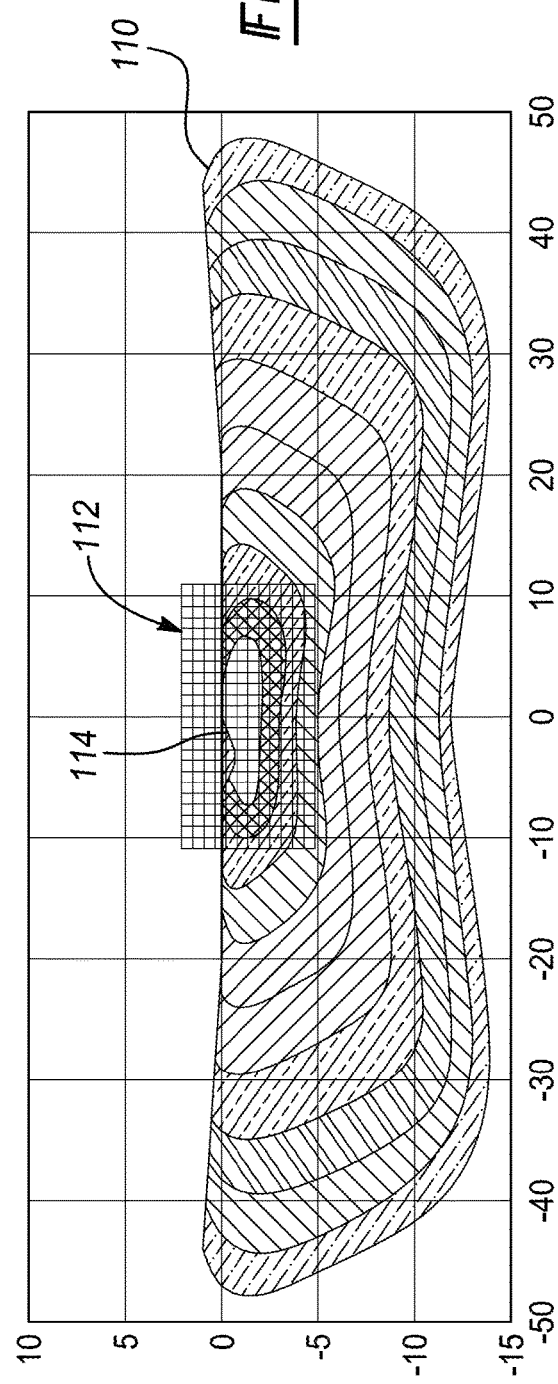

VEHICLE HEADLIGHT ASSEMBLY AND SYSTEM WITH HYBRID MATRIX LOW BEAM

CROSS REFERENCE TO RELATED APPLICATIONS

This U.S. utility patent application claims the benefit of U.S. Provisional Patent Application No. 63/409,492, filed Sep. 23, 2022, the contents of which is incorporated herein by reference in its entirety.

FIELD

The present disclosure relates generally to lighting for motor vehicles. More specifically, the present disclosure relates to low beam headlights for passenger vehicles, such as cars and trucks.

BACKGROUND

Headlight assemblies for vehicles are subject to regulations regarding a cut-off pattern in order to illuminate a roadway ahead of the vehicle while also minimizing disruption to drivers of other vehicles, including oncoming traffic and vehicles traveling ahead of and in a same direction as the subject vehicle. Several different regulations and standards for headlight illumination may apply in different jurisdictions. Examples of such regulations and standards include ECE Created by the United Nations Economic Commission for Europe, United States Department of Transportation (DOT) for use in the U.S. & Canada, CCC certification for China, and U.S. Society of Automotive Engineers (SAE) standards.

Several different techniques may be used to generate illumination by headlights having a given cut-off pattern to satisfy a given set of standards and regulations. Some examples of such techniques include shielding to block light from an illumination source to generate the cut-off pattern.

SUMMARY

The present disclosure provides a headlight assembly for a vehicle. The headlight assembly comprises a foreground light source configured to project light over a first field of view greater than 20-degrees wide. The headlight assembly also comprises a spot beam light source that includes a plurality of pixel light sources configured to project light over a second field of view smaller than the first field of view and overlapping the first field of view. The foreground light source and the spot beam light source are operable together in a low-beam mode to generate a combined low-beam projection pattern.

The present disclosure also provides a lighting system for a vehicle. The lighting system comprises two headlight assemblies. Each of the headlight assemblies includes: a foreground light source configured to project light over a first field of view greater than 20-degrees wide; and a spot beam light source. The spot beam light sources each include a plurality of pixel light sources configured to project light over a second field of view smaller than the first field of view and overlapping the first field of view. The lighting system also comprises a controller in communication with the spot beam light sources in each of the two headlight assemblies. The controller is configured to communicate pattern data to each of the spot beam light sources for controlling a cut-off pattern of the light projected therefrom.

BRIEF DESCRIPTION OF THE DRAWINGS

Further details, features and advantages of designs of the invention result from the following description of embodiment examples in reference to the associated drawings.

FIG. 16 shows an example beam pattern generated by a foreground light source and a spot beam light source generating an ECE cut-off pattern, in accordance with an aspect of the present disclosure;

FIG. 17 shows an example beam pattern generated by a foreground light source and a spot beam light source generating an SAE cut-off pattern, in accordance with an aspect of the present disclosure;

DETAILED DESCRIPTION

Figure 1:
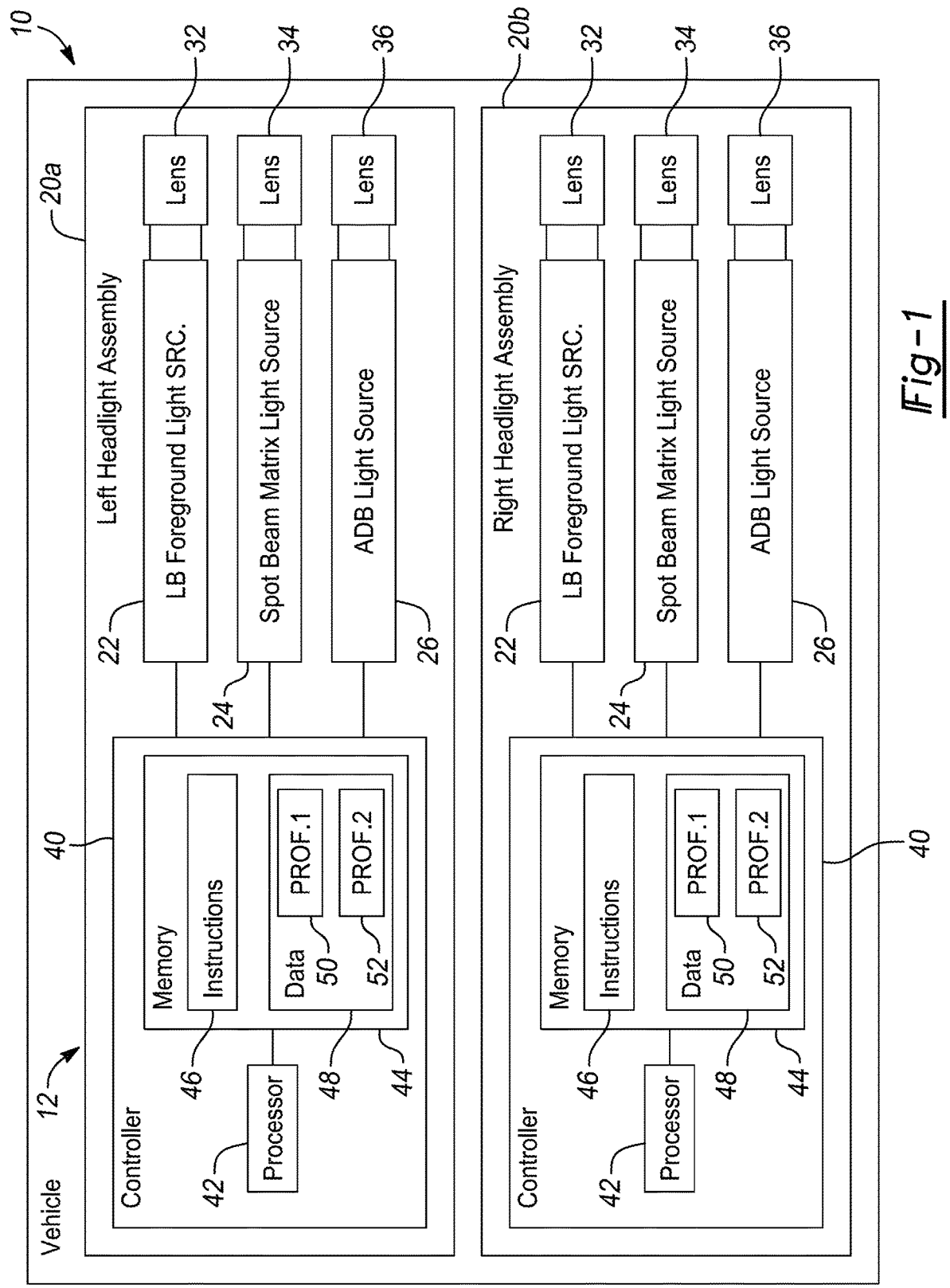
FIG. 1 shows a schematic block diagram of a vehicle with two headlight assemblies, in accordance with an aspect of the present disclosure.

Referring to the drawings, the present invention will be described in detail in view of following embodiments.

FIG. 1 shows a schematic block diagram of a vehicle 10 with a first lighting system 12, according to an aspect of the present disclosure. The vehicle 10 may be a motor vehicle, such as a passenger car or truck. However, the headlamp assembly of the present disclosure may be applicable to other types of vehicles, such as commercial trucks, busses, trains, etc. The vehicle 10 with the first lighting system 12 of the present disclosure may also be referred to as the ego vehicle or the subject vehicle. The first lighting system 12 includes a left-side headlight assembly 20a and a right-side headlight assembly 20b. Each of the headlight assemblies 20a, 20b may be similar or identical to one-another. In some embodiments, the headlight assemblies 20a, 20b may include similar or identical internal components and different external components, such as a housing that is configured to fit within the structure on the corresponding side of the vehicle 10.

As shown in FIG. 1, each of the headlight assemblies 20a, 20b includes a low-beam foreground light source 22, a spot beam light source 24, and an adaptive driving beam (ADB) light source 26. The foreground light source 22 may also be called a base light source or a foreground base light source and may include one or more light emitting diodes (LEDs), although other types of light sources may be used, such as one or more halogen light bulbs and/or a high-intensity discharge (HID) light source. In some embodiments, the spot beam light source 24 may include at least 20,000 pixel light sources, which may be individually controllable. For example, the spot beam light source 24 may include 248 columns and 82 rows of micro LEDs to provide 20,336 total micro LEDs, each forming a pixel light source. Each of the pixel light sources may include an LED element, although other types of light emitting devices may be used for the pixel light sources. Each of the pixel light sources may have a pixel size of 0.04 mm and a resolution of 0.1°×0.1°. However, the pixel light sources may have a different pixel size and/or a different resolution.

Each of the headlight assemblies 20a, 20b also includes a first lens 32 that is aligned with the low-beam foreground light source 22 to project the light therefrom outwardly in front of the vehicle 10. Each of the headlight assemblies 20a, 20b also includes a second lens 34 that is aligned with the spot beam light source 24 to project the light therefrom outwardly in front of the vehicle 10. Each of the headlight assemblies 20a, 20b also includes a third lens 36 that is aligned with the ADB light source 26 to project the light therefrom outwardly in front of the vehicle 10. In some embodiments, two or more of the lenses 32, 34, 36 may be combined. For example, a shared lens assembly 32, 36 may function as both the first lens 32 and as the third lens 36 to project light from both the low-beam foreground light source 22 and from the ADB light source 26.

Each of the headlight assemblies 20a, 20b also includes a controller 40 in communication with each of the low-beam foreground light source 22, the spot beam light source 24, and the ADB light source 26. The controller 40 may also be called a headlamp smart lighting driver or a headlamp smart LED driver. The controller 40 may be configured to control a pattern of light generated by the spot beam light source 24.

In some embodiments, the controller 40 may control operation of the low-beam foreground light source 22 and/or the ADB light source 26. For example, the controller 40 may provide an on/off signal to a switching device to turn either or both of the both of the low-beam foreground light source 22 and/or the ADB light source 26. Alternatively or additionally, the controller 40 may control a brightness level of either or both of the both of the low-beam foreground light source 22 and/or the ADB light sources 26. In some embodiments, the controller 40 may control a light distribution output of the ADB light source 26, such as a beam pattern generated by the ADB light source 26.

The controller 40 includes a processor 42 coupled to a storage memory 44. The storage memory 44 includes instruction storage 46 storing instructions, such as program code for execution by the processor 42. The storage memory 44 also includes data storage 48 for holding data for use by the processor 42. The data storage 48 includes a first profile data 50 and a second profile data 52 representing first and second cut-off patterns, respectively, to be generated by the spot beam light source 24.

Figure 2:
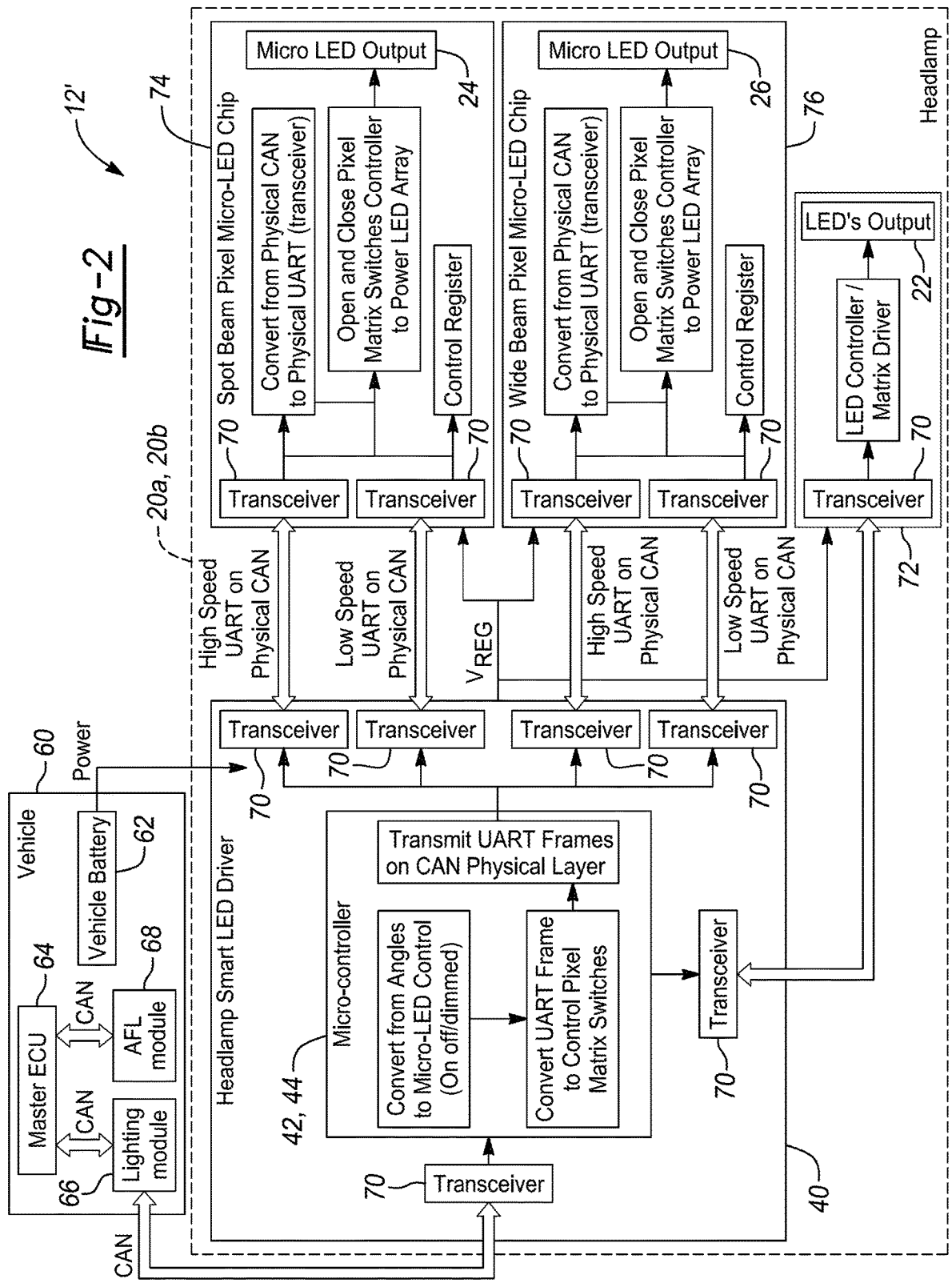
FIG. 2 shows a schematic block diagram of a lighting system for a vehicle, in accordance with an aspect of the present disclosure.

FIG. 2 shows a schematic block diagram of a second lighting system 12' for a vehicle. The second lighting system 12' may include the first lighting system 12. For simplicity, the second lighting system 12' shows only one of the two headlight assemblies 20a, 20b. However, each of the two headlight assemblies 20a, 20b may have a similar or identical configuration. The second lighting system 12' includes a vehicle electrical system 60 that includes a vehicle battery 62 and a master electronic control unit (ECU) 64. The master ECU 64 may be part of a body control module (BCM) that controls various electrical devices and systems related to operation of the vehicle. The master ECU 64 includes a lighting module 66 and an adaptive forward lighting (AFL) controller 68. The vehicle electrical system 60 provides both power and data signals to each of the two headlight assemblies 20a, 20b. Controller Area Network (CAN) interfaces are shown on FIG. 2 for providing data interconnections. However, other types of data networks may be used.

FIG. 2 shows the lighting module 66 in functional communication with a microcontroller 42, 44 of the controller 40 in the headlight assemblies 20a, 20b via a transceiver 70. The controller 40 includes several transceivers 70, each providing communication to a corresponding external device. One or more of the transceivers 70 may provide CAN interfaces. However, other communications interfaces, such as high-speed and/or low-speed serial communications may be implemented using one or more universal asynchronous receiver-transmitters (UARTs).

As shown in FIG. 2, the headlight assemblies 20a, 20b include a foreground lighting module 72 including the foreground light source 22 and a transceiver 70 in communication with a corresponding transceiver 70 in the controller 40. The foreground lighting module 72 receives power and a digital control signal from the controller 40 for controlling light output by the foreground light source 22. The headlight assemblies 20a, 20b also include a spot beam lighting module 74 that includes the spot beam light source 24 and two transceivers 70, each in communication with corresponding transceivers 70 in the controller 40. The spot beam lighting module 74 receives power and a digital control signal from the controller 40 for controlling light output by the spot beam light source 24. The headlight assemblies 20a, 20b also include an ADB lighting module 64 that includes the ADB light source 26 and two transceivers 70, each in communication with corresponding transceivers 70 in the controller 40. The ADB lighting module 74 receives power and a digital control signal from the controller 40 for controlling light output by the ADB light source 26. In some embodiments, and as shown in FIG. 2, the ADB lighting module 76 includes a wide-beam pixel micro LED chip, and the ADB light source 26 includes a matrix of micro-LEDs. However, other types of devices may be used for the ADB lighting module 76 and the corresponding ADB light source 26.

Figure 3:
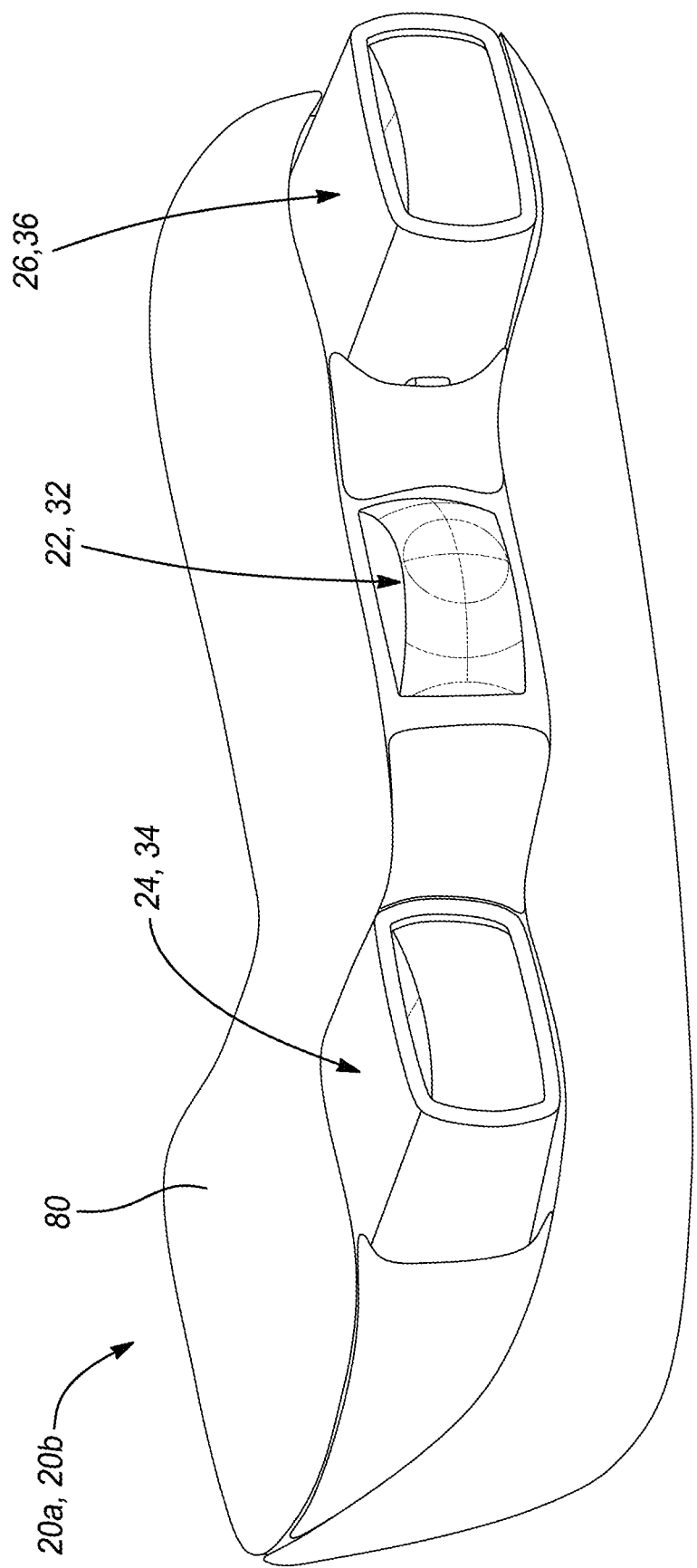
FIG. 3 shows a perspective view of a headlight assembly with partial transparency to show internal structures, in accordance with an aspect of the present disclosure.

FIG. 3 shows a perspective view of a headlight assembly 20a, 20b, including a housing 80 containing a foreground base lamp 22, 32, a spot LB lamp 24, 34, and a wide beam ADB lamp 26, 36. The foreground base lamp 22, 32 includes the foreground light source 22 and the first lens 32. The spot LB lamp 24, 24 includes the spot beam light source 24 and the second lens 34. The wide beam ADB lamp 26, 36 includes the ADB light source 26 and the third lens 36. The housing 80 may contain one or more other components, such as electronic and power supply components of the controller 40 and/or one or more of the lighting modules 72, 74, 76.

Figure 4:
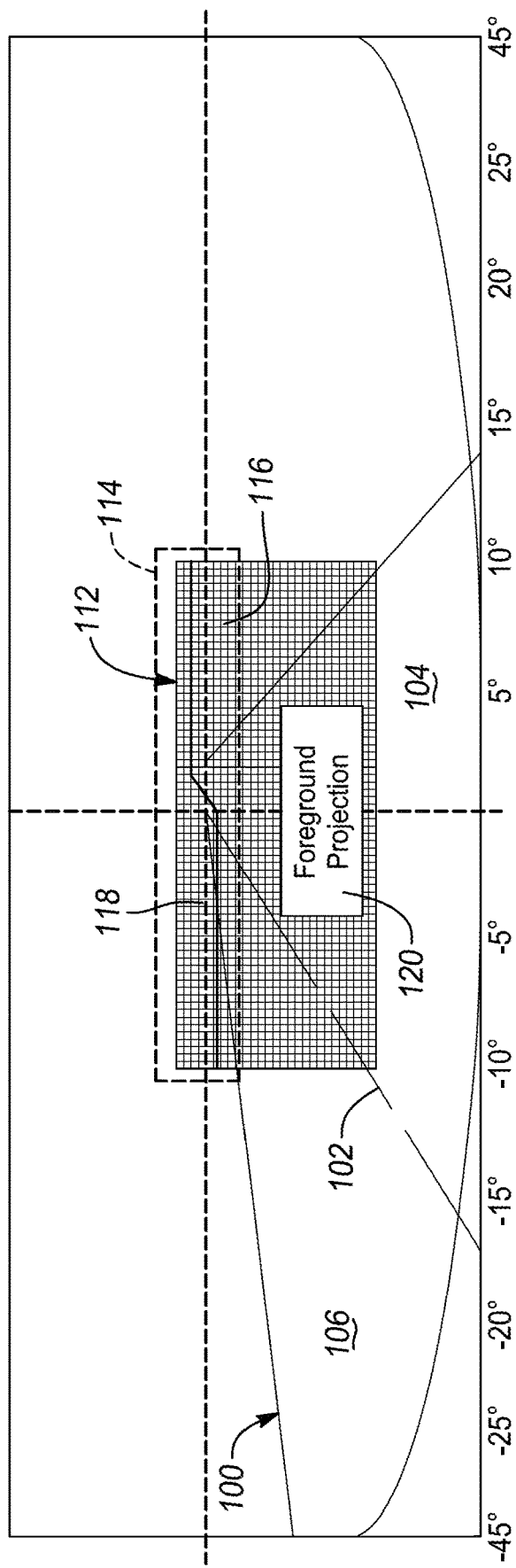
FIG. 4 shows a field of view with a projection pattern for a low beam (LB) adaptive passing beam, in accordance with an aspect of the present disclosure.

FIG. 4 shows a field of view with a projection pattern for a low beam (LB) adaptive passing beam, in accordance with an aspect of the present disclosure. FIG. 4 shows a roadway 100 including a center divider 102 that separates an ego lane 104 from an oncoming lane 106. The roadway 100 is arranged for right-hand driving, such as is standard for North America and continental Europe, with the subject vehicle traveling in the ego lane 104 on the right-side, and with oncoming traffic in the oncoming lane 106 located to the left side from the perspective of a driver of the subject vehicle.

A foreground base illumination pattern 110 is projected over a first field of view having a width of about 90-degrees (from −45-degrees to +45-degrees), and a with a generally semicircular shape that extends along or adjacent to the horizon and below the horizon by about 15-degrees. However, the first field of view of the foreground base illumination pattern 110 may have a different height and/or width. The foreground base illumination pattern 110 is generated by one or more of the foreground base lamps 22, 32.

A spot-beam illumination pattern 112 is projected over a second field of view that is smaller than the first field of view and which overlaps the first field of view. The spot-beam illumination pattern 112 is generated by one or more of the spot beam light sources 24. In some embodiments, and as shown in FIG. 4, the spot-beam illumination pattern 112 partially overlaps and extends above the foreground base illumination pattern 110. Alternatively, the spot-beam illumination pattern 112 may fully overlap the first field of view of the foreground base illumination pattern 110 and/or be separate and not overlap any of the first field of view of the foreground base illumination pattern 110.

The second field of view of the spot-beam illumination pattern 112 may have a width of about 21-degrees (from −10.5-degrees to +10.5-degrees). In some embodiments, the second field of view of the spot-beam illumination pattern 112 may have a height of about 7-degrees (from −3.5-degrees to +3.5-degrees). However, the second field of view of the spot-beam illumination pattern 112 may have a different height and/or width. The spot-beam illumination pattern 112 may be comprised of a plurality of pixels arranged in a matrix pattern and each having a resolution of 0.1 degree by 0.1 degree.

The spot-beam illumination pattern 112 defines a cut-off pattern 114, which may also be called a cut-off line. The cut-off pattern 114 defines a boundary that separates the spot-beam illumination pattern 112 into a lower region 116 and an upper region 118 above the lower region 116. The spot-beam illumination pattern 112 may provide a brighter illumination in the lower region 116 than in the upper region 118. The cut-off pattern 114 may include one or more horizontal line segments at different heights. In some embodiments, and as shown in FIG. 4, the cut-off pattern 114 may include one or more vertical or diagonal line segments connecting the different horizontal line segments at the different heights.

In some embodiments, and as shown in FIG. 4, the spot-beam illumination pattern 112 defines a foreground projection 120 including a graphic image projected on a surface, such as on a surface of the roadway 100.

Figure 5A:
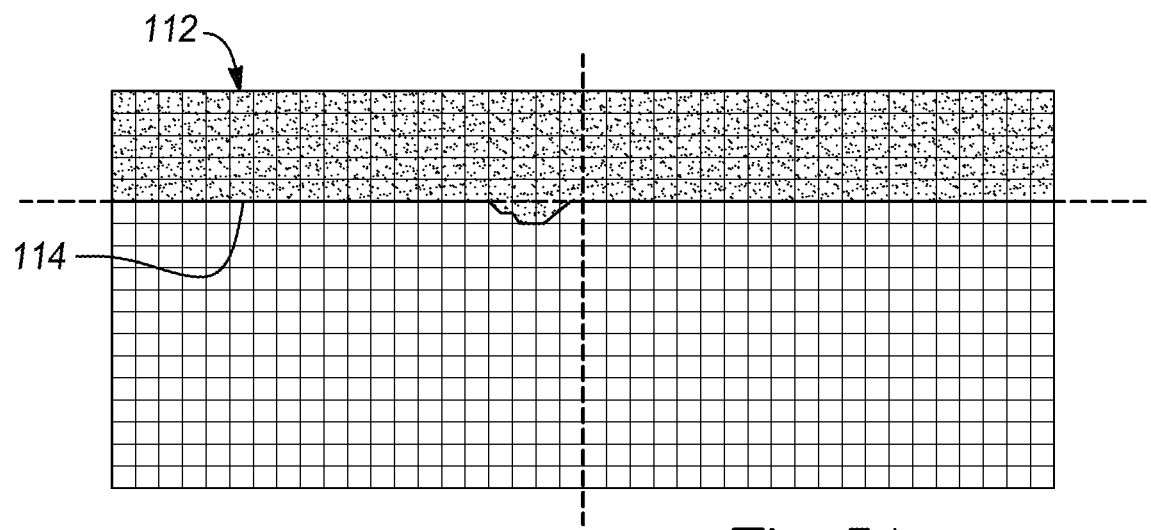
FIGS. 5A-5C show various different cut-off patterns for different regulations and standards for headlight illumination.
Figure 5B:
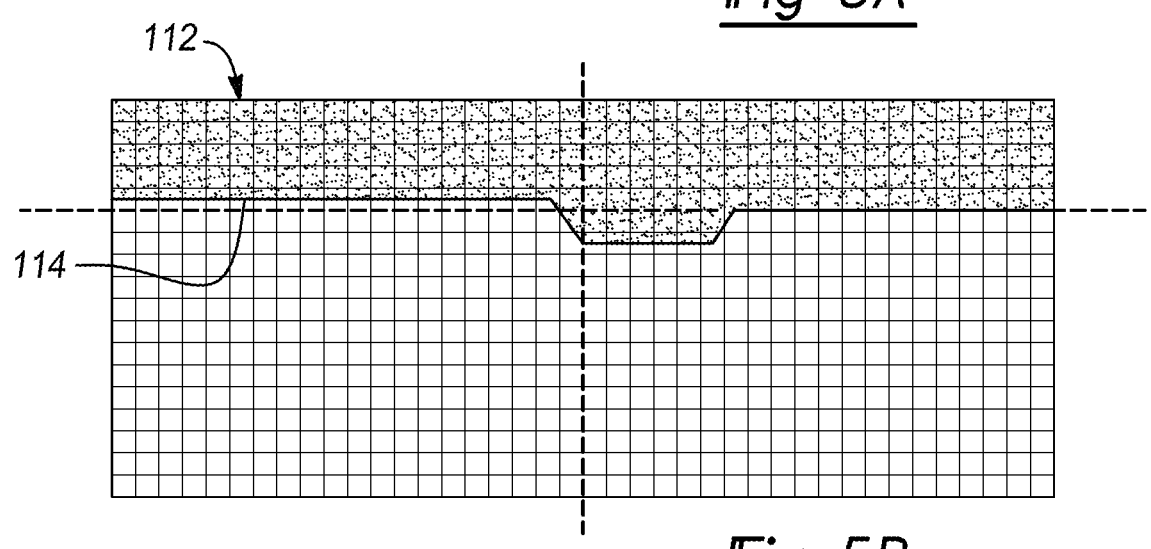
Figure 5C:
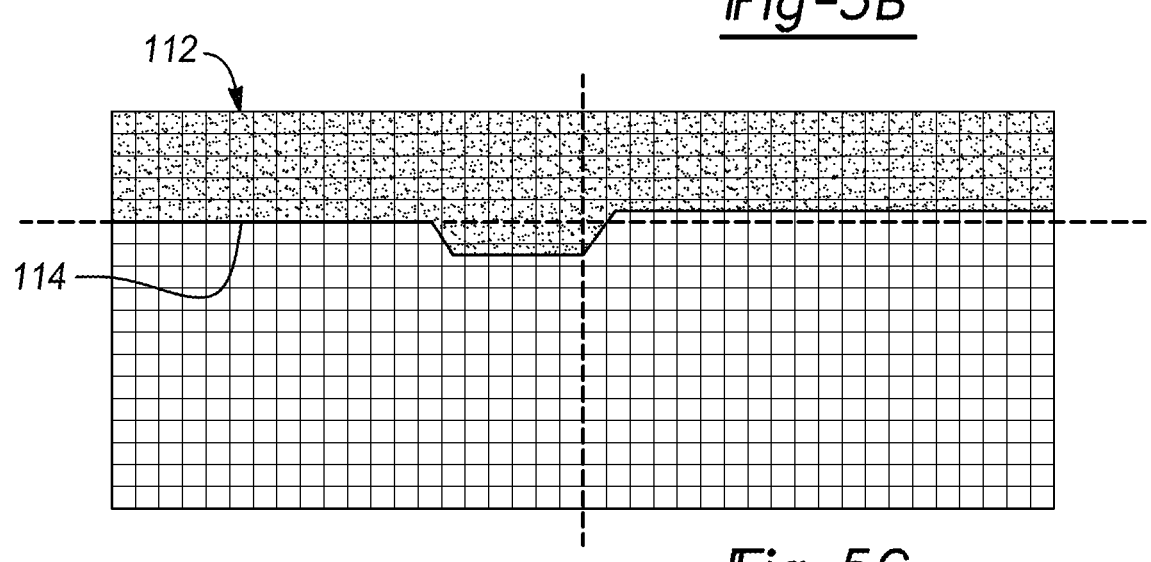

FIGS. 5A-5C show various different cut-off patterns 114 provided by the spot-beam illumination pattern 112 for different regulations and standards for headlight illumination. FIG. 5A shows an example of the cut-off pattern 114 that is formed in accordance with SAE standards for North America. FIG. 5B shows an example of the cut-off pattern 114 that is formed in accordance with ECE standards for Europe and with a left-hand drive (LHD) configuration. FIG. 5C shows an example of the cut-off pattern 114 that is formed in accordance with ECE standards for Europe and with a right-hand drive (RHD) configuration.

Figure 6:
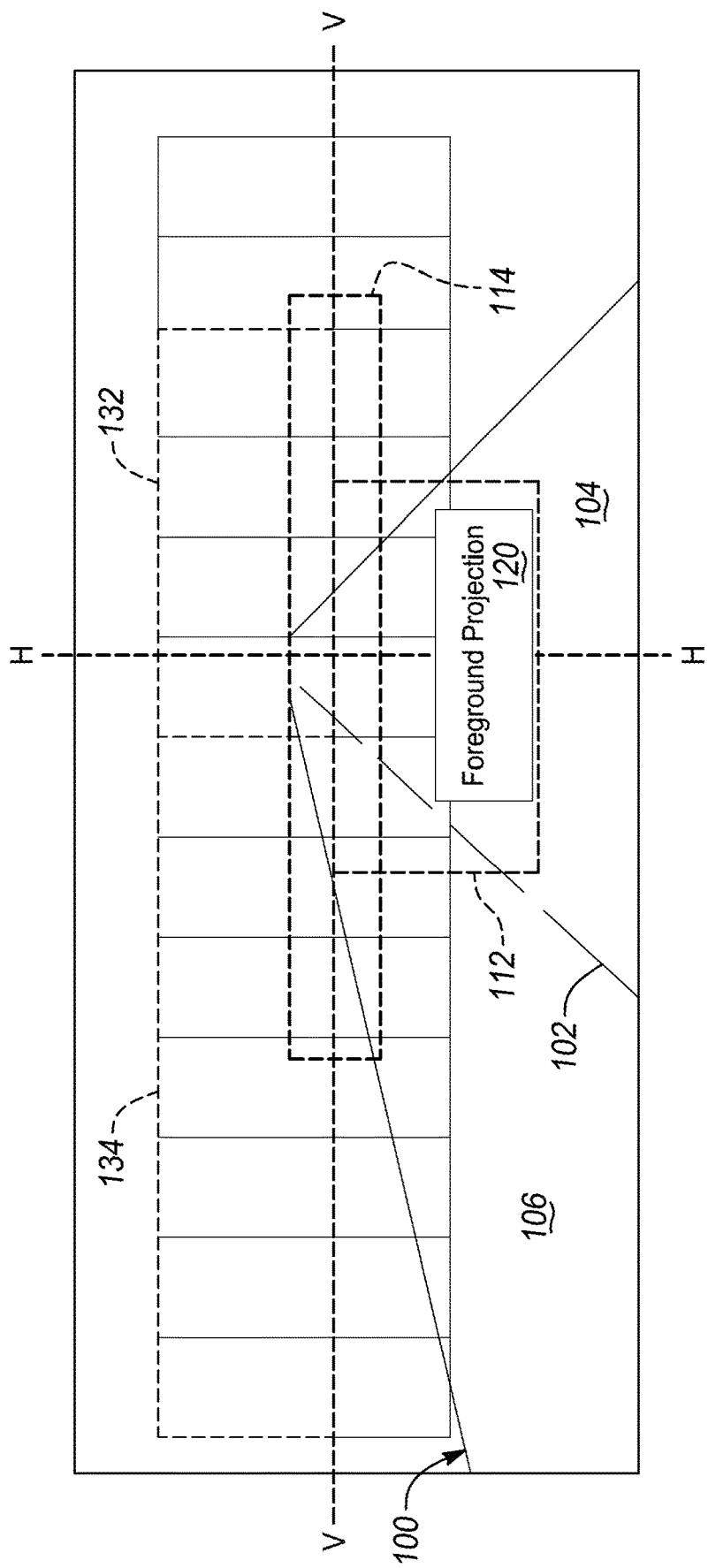
FIG. 6 shows a combined field of view with projection patterns of various light sources in accordance with an aspect of the present disclosure.

FIG. 6 shows a combined field of view with projection patterns 110, 112, 130 of the low-beam foreground light source 22, the spot beam light source 24, and the ADB light source 26, respectively. The projection patterns 110, 112, 130 may include similar or identical low-beam projection patterns 110, 112 of FIG. 4, and with the addition of an ADB projection pattern 130 provided by the ADB light source 26. The ADB projection pattern 130 is larger than the second field of view of the spot-beam illumination pattern 112 produced by the spot beam light source 24. In some embodiments, and as shown in FIG. 6, the ADB projection pattern 130 at least partially overlaps the spot-beam illumination pattern 112 produced by the spot beam light source 24.

The ADB light source 26 includes multiple light sources, which may be separately and independently controlled to shut off or dim to selectively and independently reduce illumination in one or more regions of the ADB projection pattern 130. Thus, the ADB light source 26 may increase overall visibility while reducing or eliminating bright light directed toward other traffic, such as preceding and oncoming vehicles, that could otherwise cause glare or dazzling. The ADB light source 26 may be operated as a permanent high-beam that may be operated at all times that the headlights are operated.

The ADB projection pattern 130 includes an ADB preceding pattern 132 aligned with the ego lane 104, and therefore potentially directed toward preceding vehicles located on the ego lane 104 ahead of the subject vehicle 10. The ADB projection pattern 130 includes an ADB oncoming pattern 134 aligned with the oncoming lane 106, and therefore potentially directed toward oncoming vehicles located on the oncoming lane 104.

Figure 7:
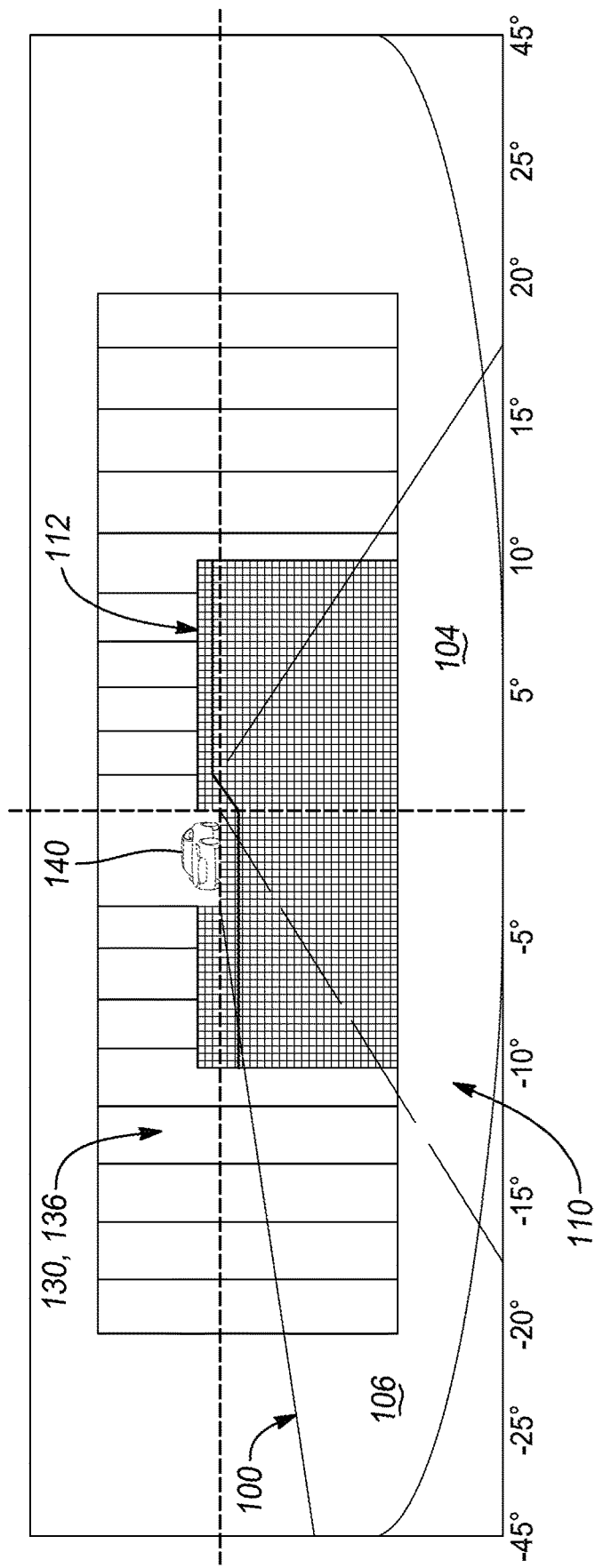
FIG. 7 shows a field of view with a projection pattern for LB light sources and an adaptive driving beam (ADB) including a plurality of segments, in accordance with an aspect of the present disclosure.

FIG. 7 shows a field of view with LB projection patterns 110, 112 and with an ADB projection pattern 130 that includes a plurality of ADB segments 136 provided by the ADB light source 26. The plurality of ADB segments 136 are configured as vertical bars that are aligned parallel and adjacent to one another and which extend below and above the horizon, which is indicated as a horizontal dashed line. In some embodiments, the ADB projection pattern 130 may include twenty-four (24) to sixty (60) of the ADB segments 136. The ADB projection pattern 130 is larger than and extends above and horizontally beyond the spot-beam illumination pattern 112. In some embodiments, the ADB segments 136 of the ADB projection pattern 130 may overlap some or all of the spot-beam illumination pattern 112. FIG. 7 also shows an oncoming vehicle 140 traveling in the oncoming lane 106 and toward the subject vehicle 10. The lighting system 12, 12' may be configured to cause the ADB light source 26 to selectively dim or darken one or more of the plurality of ADB segments 136. For example, the controller 40 may cause the ADB light source 26 to selectively dim one or more of the ADB segments 136 in response to detecting another vehicle, such as the oncoming vehicle 140. The controller 40 may use data from one or more cameras and/or other sensors to detect the other vehicle or vehicles for controlling the selective dimming of the ADB segments 136. The one or more ADB segments 136 may include those of the ADB segments 136 that are horizontally aligned with or within a predetermined area of a direction of the detected vehicle.

Figure 8:
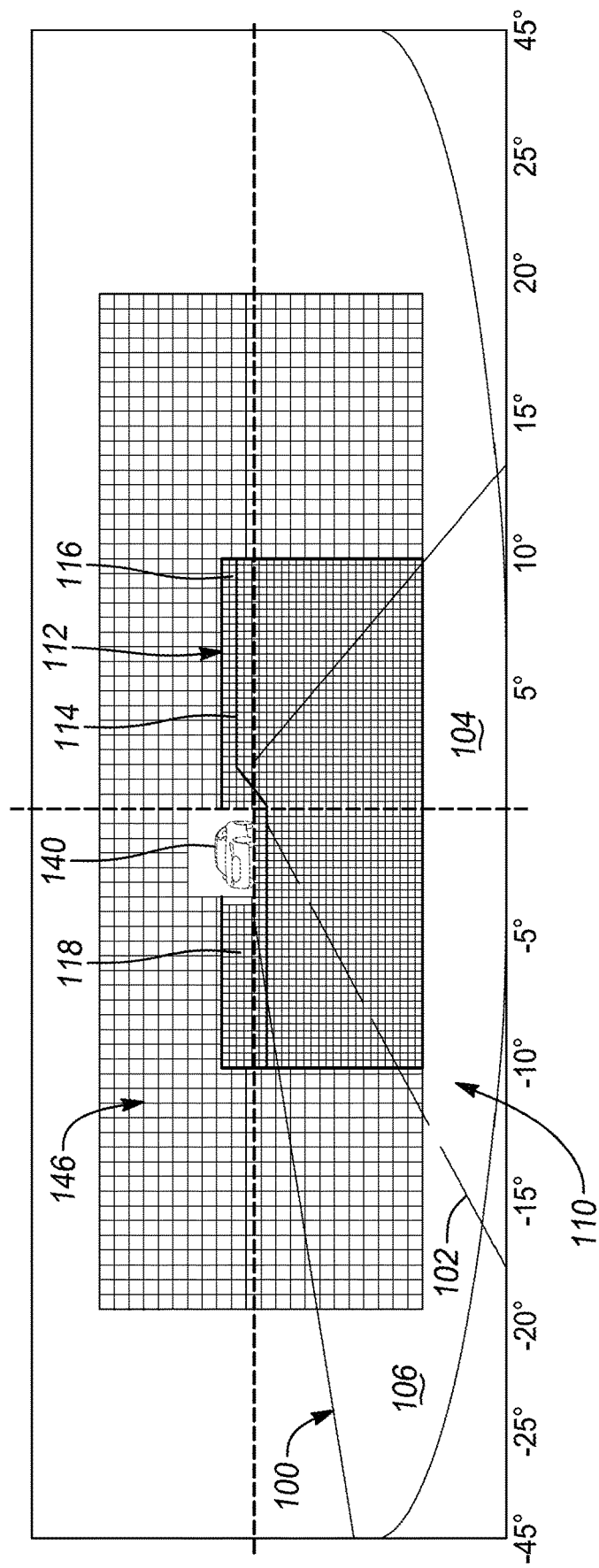
FIG. 8 shows a field of view with a projection pattern for LB light sources and an ADB including a wide beam matrix light source, in accordance with an aspect of the present disclosure.

FIG. 8 shows a field of view with a projection pattern for LB projection patterns 110, 112 and with an ADB projection pattern 130 that includes a matrix of ADB pixels 146, which may be arranged in a plurality of rows and a plurality of columns. The field of view of FIG. 8 may be similar or identical to FIG. 7, except with a different ADB projection pattern. The matrix of ADB pixels 146 may be produced by the ADB light source 26, where the ADB light source 26 includes a matrix light source, such as a matrix of LED illuminators. The lighting system 12, 12' may be configured to cause the ADB light source 26 to selectively dim or darken a region of the ADB pixels 146 that corresponds to a direction of the detected vehicle 140. The region of the ADB pixels 146 may include a two-dimensional region having both a vertical and a horizontal size and position that may be specifically directed to the detected vehicle 140. For example, the controller 40 may cause the ADB light source 26 to vary a position to increase a size of a darkened region as the detected vehicle 140 moves toward the subject vehicle 10, and therefore takes up a larger portion of the field of view. In some embodiments, the spot beam light source 24 may also dim or darken a region of the spot-beam illumination pattern 112 in response to detecting a vehicle 140 that is aligned with the spot-beam illumination pattern 112. Therefore, the spot beam light source 24 may provide similar functionality to the ADB light source to avoid directing bright light toward other vehicles 140, that could otherwise cause glare for drivers of the other vehicles 140.

Figure 9:
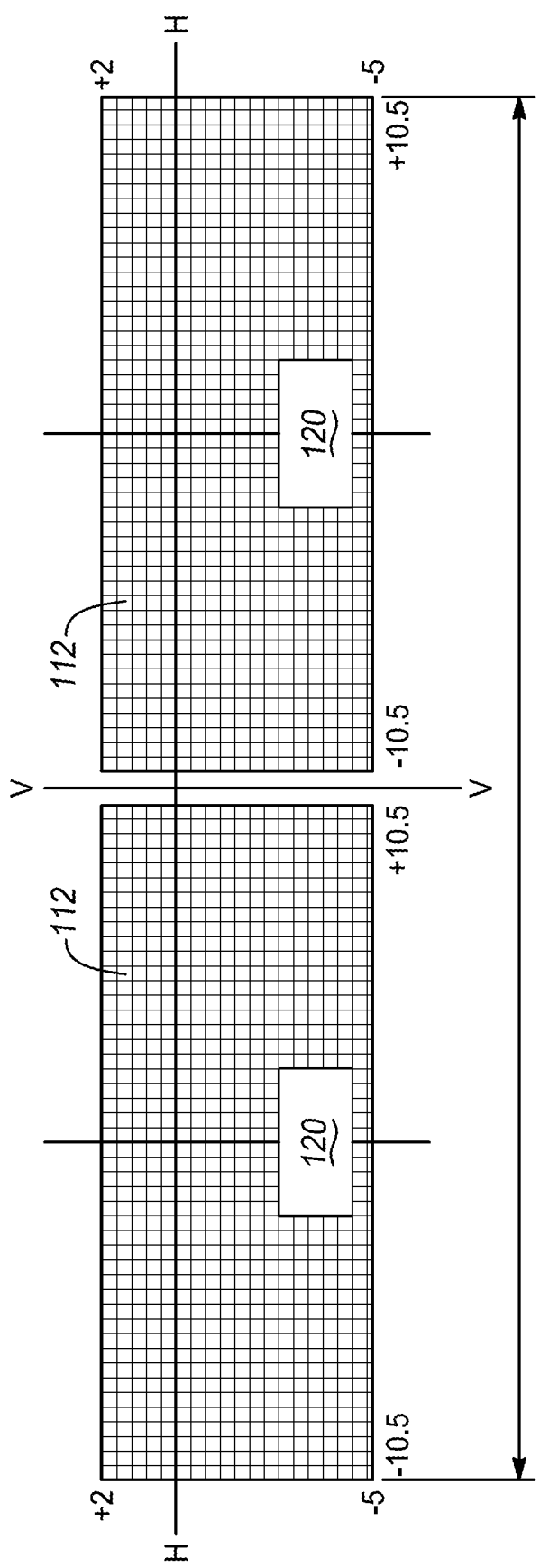
FIG. 9 shows a combined headlight projection pattern including fields of view of two spot beam light sources, in accordance with an aspect of the present disclosure.

FIG. 9 shows a combined headlight projection pattern including fields of view (FOV) of two headlight assemblies 20a, 20b including two corresponding spot-beam illumination patterns 112, each of which having a width of 21-degrees and a height of 7-degrees. The two spot-beam illumination patterns 112 are labeled Left Headlight (HL) for the left-side headlight assembly 20a and Right HL for the right-side headlight assembly 20b.

Figure 10:
FIGS. 10-11 each show a headlight projection pattern with different projected images, in accordance with an aspect of the present disclosure.
Figure 11:
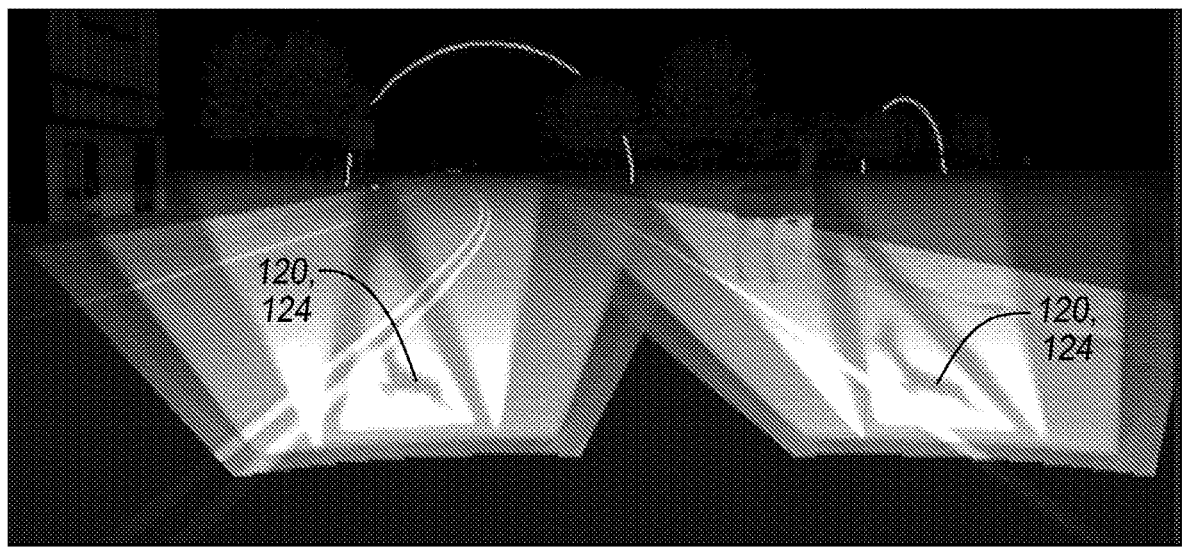

In some embodiments, and as shown in FIGS. 10-11, one or both of the spot beam light sources 24 may be configured to generate the foreground projection 120 projecting a graphical image 122, 124 onto a surface, such as a road surface, in front of the vehicle 10. For example, and as shown in FIG. 10, the two spot-beam illumination patterns 122 may each include a first graphical image 122, such as an arrow indicating a possible or desired turn for a driver of the vehicle to follow in navigating a route, and formed as a positive image defined by illuminated areas of the spot-beam illumination patterns 112. In some embodiments, the controller 40 may receive information regarding the first graphical image 122 from another source, such as a GPS navigation system. In another example, and as shown in FIG. 11, the two spot-beam illumination patterns 122 may each include a second graphical image 124, such as a warning graphic indicating a potential hazard on the road, and formed as a negative image defined by dark or dimed areas of the spot-beam illumination patterns 112 and which are surrounded by bright areas of the spot-beam illumination patterns 112. In some embodiments, the controller 40 may present such warning graphics in response to detecting a hazard, such as an animal on or near the road. Alternatively or additionally, the controller 40 may present warning graphics in response to received reports of a hazard or from other sources. For example, the lighting system 12, 12' may be configured to generate the foreground projection 120 based on information shown on conventional road signs.

Figure 12A:
FIGS. 12A-12F each show different projection patterns generated by a lighting system in accordance with an aspect of the present disclosure FIGS. 13A-13E each shows a side view of a vehicle, illustrating a headlight projection pattern in various different situations.
Figure 12B:
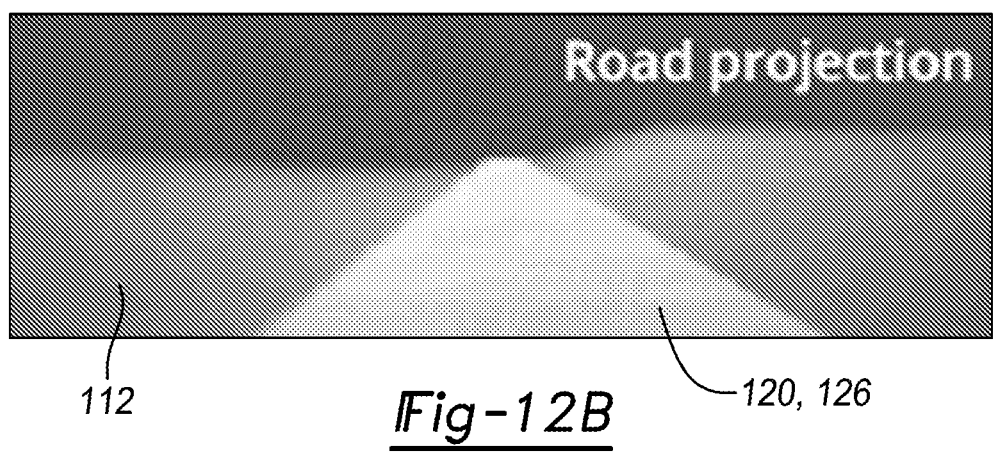
Figure 12C:
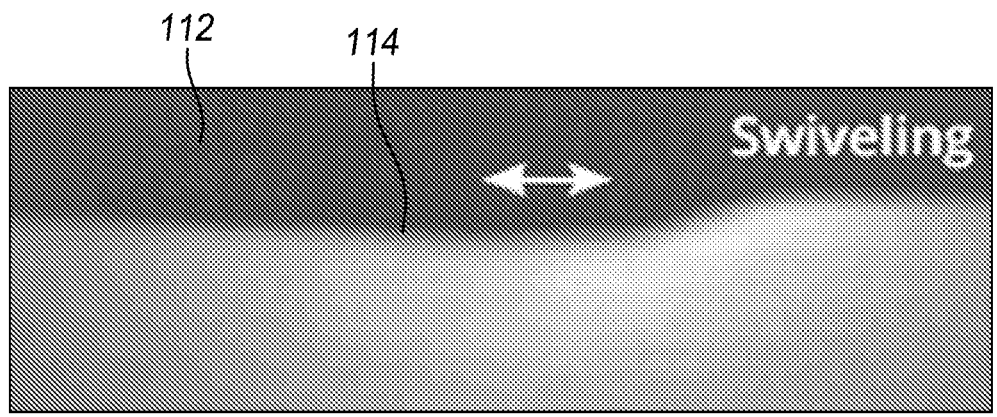
Figure 12D:
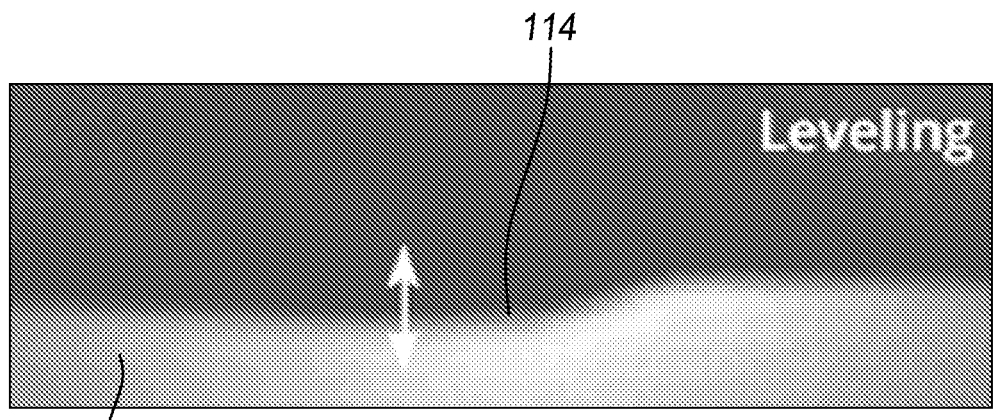
Figure 12E:
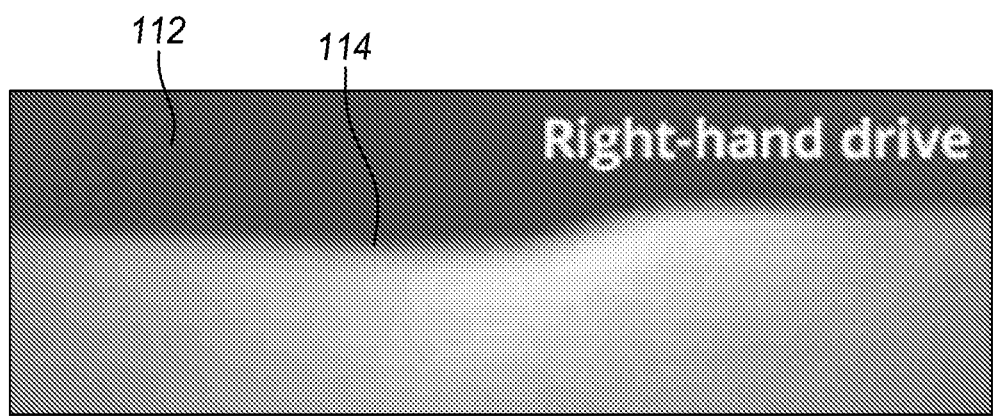
Figure 12F:
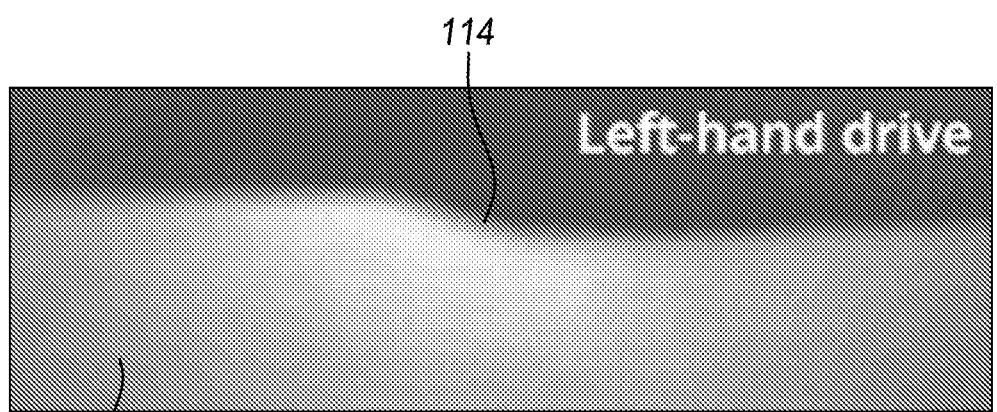

FIGS. 12A-12F each show different features of the spot-beam illumination pattern 112 generated by one or both of the spot beam light sources 24 in different situations. FIG. 12A shows the spot-beam illumination pattern 112 having a dimmed region 142 that may correspond to a region where an oncoming vehicle 140 (not shown on FIG. 12A) is detected. FIG. 12B shows the spot-beam illumination pattern 112 with a foreground projection 120 with a roadway illumination pattern 126 that may highlight one or more parts of the roadway. Such a roadway illumination pattern 126 may be useful in low-visibility conditions, such as heavy fog or where the roadway is covered by snow or other material. FIG. 12C shows the spot-beam illumination pattern 112 with a cut-off pattern 114 that is swiveled or moved in a horizontal direction (i.e. left or right). For example, the controller 40 may instruct one or both of the spot beam light sources 24 to adjust the spot-beam illumination patterns 112 to swivel the cut-off pattern 114 left or right based on a curve in the roadway and/or a turning of the subject vehicle 10 around a corner. FIG. 12D shows the spot-beam illumination pattern 112 with a cut-off pattern 114 having an adjustable height position. For example, the controller 40 may instruct one or both of the spot beam light sources 24 to adjust the spot-beam illumination patterns 112 to control a vertical position of the cut-off pattern.

FIGS. 13A-13D each shows a side view of a vehicle 10, illustrating a headlight projection pattern in various different situations. More specifically, FIGS. 13A-13D show the spot-beam illumination patterns 112 generated by one or both of the spot beam light sources 24 in different situations. In FIG. 13A, the vehicle 10 is traveling on a level road surface with no vehicle within a given distance ahead of the vehicle 10, such as the area illustrated. In this case, the spot-beam illumination pattern 112 extends a relatively large height to illuminate a large area in front of the vehicle 10. In FIG. 13B, the vehicle 10 is traveling on a level road surface, and another vehicle is located ahead of the vehicle 10 and within the given distance, and the spot-beam illumination pattern 112 is tilted downward so to not shine onto the other vehicle, where it could otherwise disturb the driver of the other vehicle. In FIG. 13C, the vehicle 10 is traveling on a level road surface, and another vehicle is located ahead of the vehicle 10 and closer than in FIG. 13B and the spot-beam illumination pattern 112 is tilted further downward so to not shine onto the other vehicle. In FIG. 13C, the vehicle 10 is traveling on a downward sloped road surface, and another vehicle is located ahead of the vehicle 10 and within the given distance, and the spot-beam illumination pattern 112 is not tilted, but, because of the slope of the road surface, does not shine onto the other vehicle. In FIG. 13D, the vehicle 10 is traveling on a downward sloped road surface, and another vehicle is located ahead of the vehicle 10 and within the given distance, and the spot-beam illumination pattern 112 is tilted downward so to not shine onto the other vehicle, where it could otherwise disturb the driver of the other vehicle. In some embodiments, the controller 40 may adjust the leveling of the beam illumination patterns 112 differently, depending on whether the other vehicle is an oncoming vehicle traveling toward the subject vehicle 10 or whether the other vehicle is traveling in a same direction as the subject vehicle 10.

Figure 14:
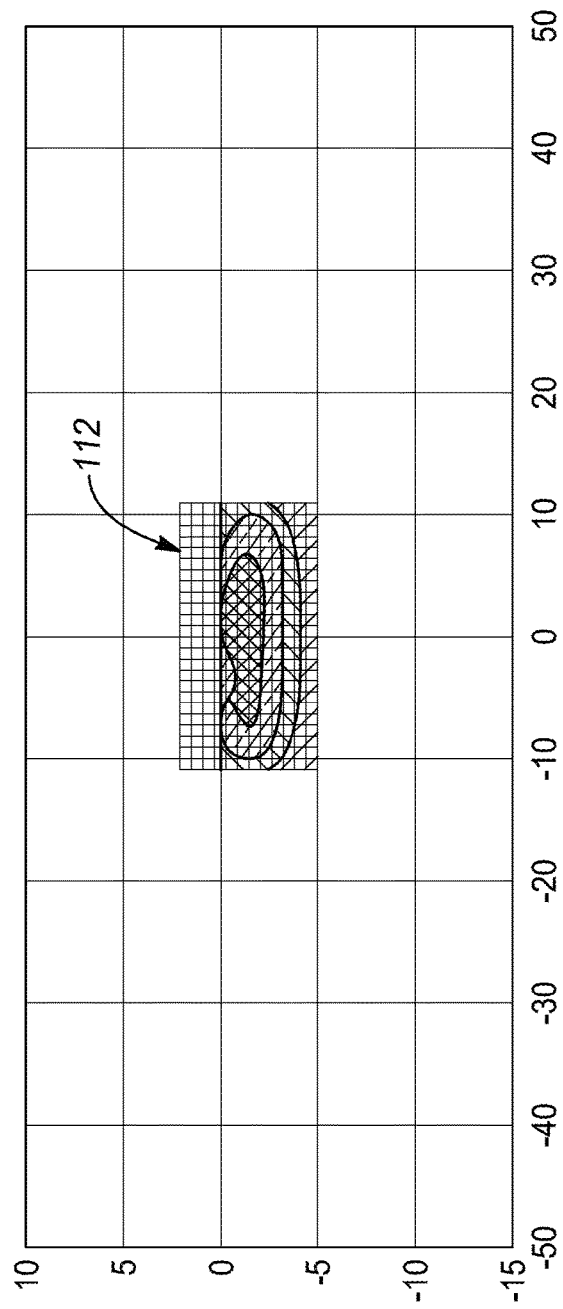
FIG. 14 shows an example beam pattern generated by a spot beam light source, in accordance with an aspect of the present disclosure.
Figure 15:
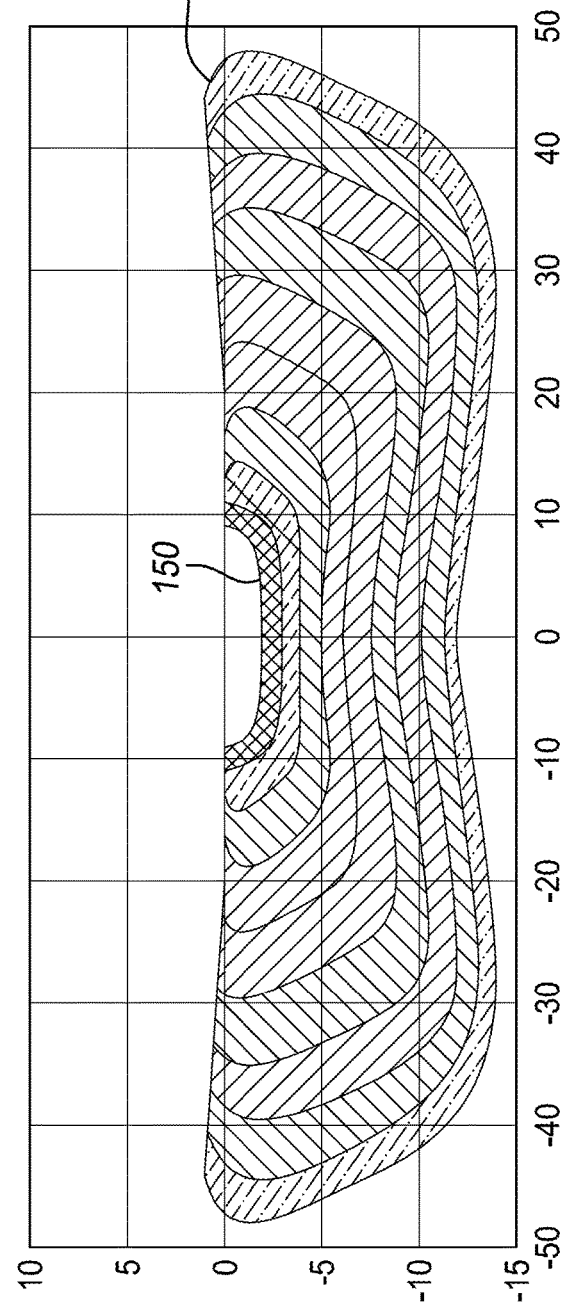
FIG. 15 shows an example beam pattern generated by a foreground light source, in accordance with an aspect of the present disclosure.

FIG. 14 shows an example of the spot-beam illumination pattern 112 generated by the spot beam light source 24. FIG. 15 shows an example of the foreground base illumination pattern 110 generated by the low-beam foreground light source 22. In some embodiments, and as shown on FIG. 15, the foreground base illumination pattern 110 defines a notch 150 of little to no illumination. The notch 150 may be centered horizontally, and extending downwardly from the horizon. As shown in FIGS. 16-17, the spot-beam illumination pattern 112 may be aligned with the notch 150 to fill-in illumination in an area of the notch 150.

FIG. 16 shows an example combined low-beam projection pattern including the projection patterns 110, 112 of the low-beam foreground light source 22 and the spot beam light source 24, respectively, and with the spot-beam illumination pattern 112 generating a cut-off pattern 114 in accordance with ECE standards. FIG. 17 shows another example combined low-beam projection pattern including the projection patterns 110, 112 of the low-beam foreground light source 22 and the spot beam light source 24, respectively, and with the spot-beam illumination pattern 112 generating a cut-off pattern 114 in accordance with SAE standards.

Figure 18:
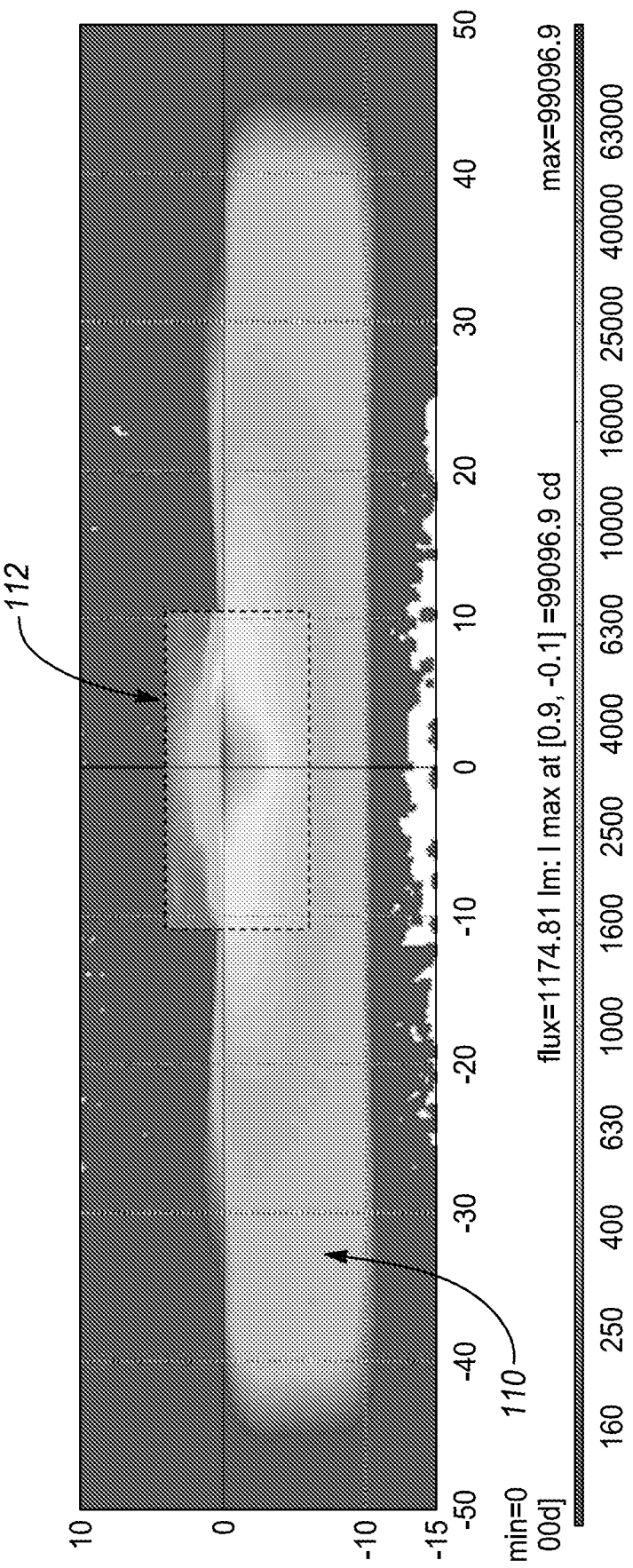
FIG. 18 shows a graph of light intensity over a field of view and generated by a foreground light source and a spot beam light source, in accordance with an aspect of the present disclosure.

FIG. 18 shows a graph of light intensity for the projection patterns 110, 112 over a field of view and generated by the low-beam foreground light source 22 and the spot beam light source 24, respectively.

Figure 19A:
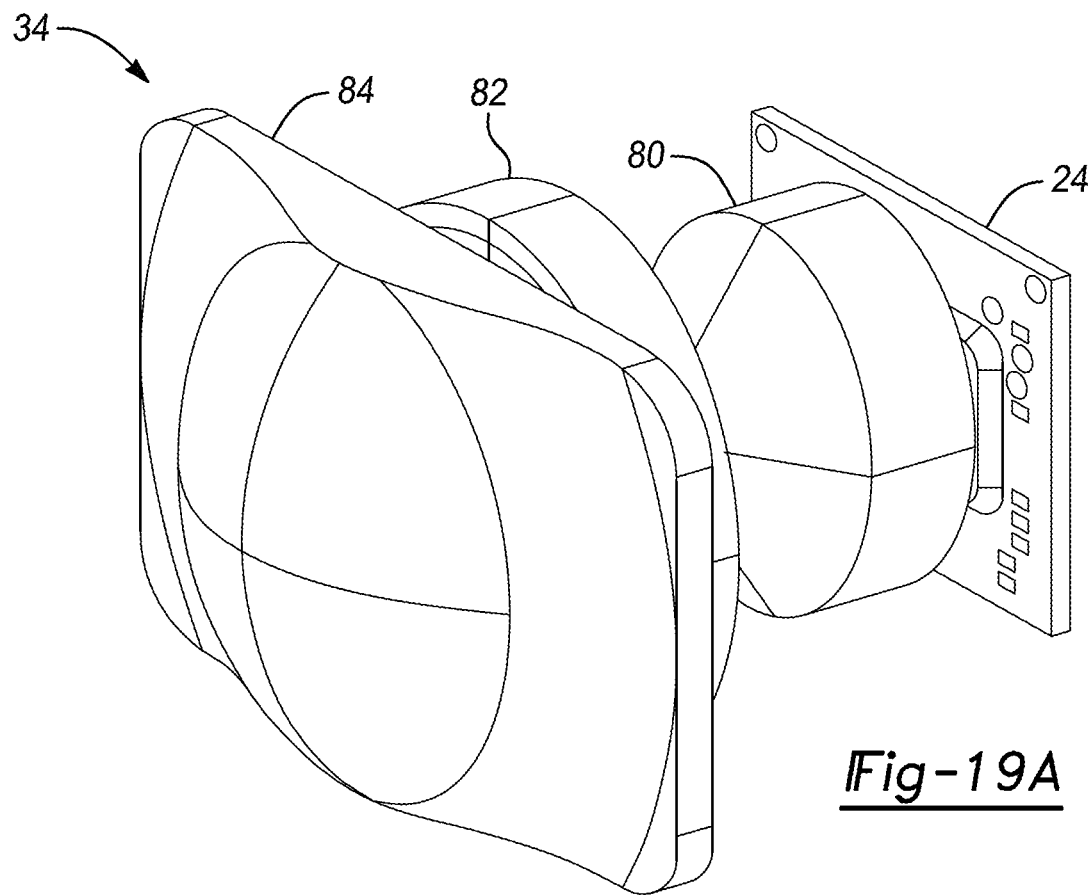
FIG. 19A-19B each show a corresponding view of a lens assembly for a spot beam light source in a headlight assembly, in accordance with an aspect of the present disclosure.
Figure 19B:
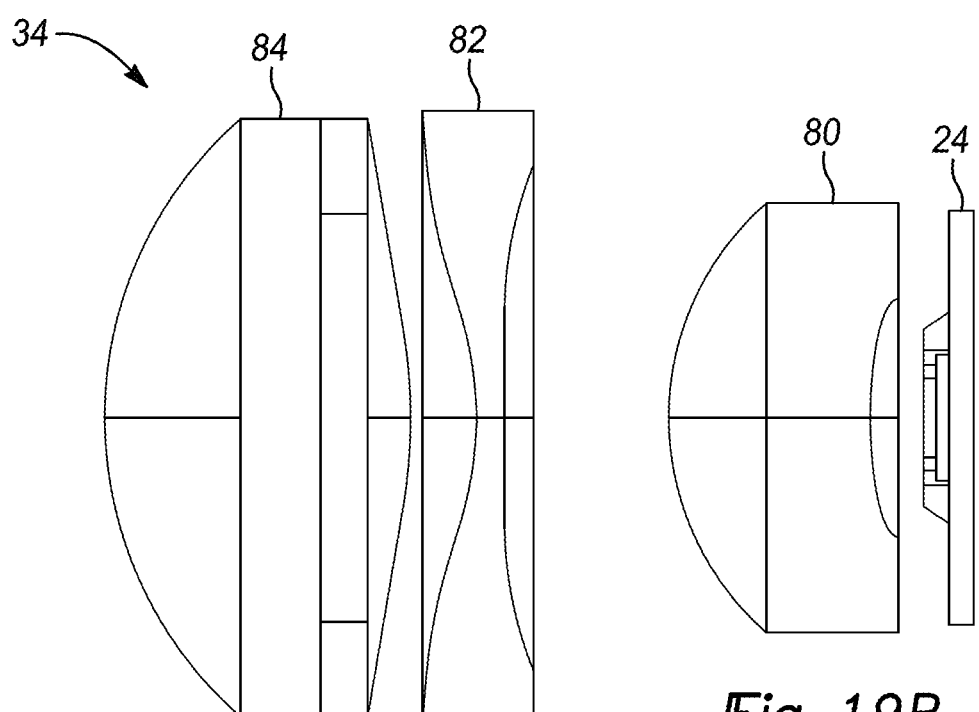

FIGS. 19A-19B each show a corresponding view of the second lens 34 for the spot beam light source 24, in accordance with an aspect of the present disclosure. The second lens 34 may have a different configuration from the example embodiment shown in FIGS. 19A-19B. The second lens 34 may have a different number of the lens elements 80, 82, 84. For example, the second lens 34 may have three, four, five, or more of the lens elements 80, 82, 84.

The second lens 34, as shown in FIGS. 19A-19B, includes a first lens element 80, a second lens element 82, and a third lens element 84 along a light path from the spot beam light source 24. Any or all of the lens elements 80, 82, 84 may be made of any light-transmissive material, such as a polymer material or a glass material.

As best shown in FIG. 19B, the first lens element 80 includes a concave input surface for receiving the light from the spot beam light source 24 and a convex output surface for projecting light therefrom. The second lens element 82 includes a concave input surface for receiving the light from the first lens element 80 and a concave output surface for projecting light therefrom. The third lens element 84 includes a convex input surface for receiving the light from the second lens element 82 and a convex output surface for projecting light therefrom.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A headlight assembly for a vehicle, comprising:
  a foreground light source configured to project light over a first field of view greater than 20-degrees wide;
  a spot beam light source including a plurality of pixel light sources configured to project light over a second field of view smaller than the first field of view and overlapping the first field of view wherein the spot beam light source is configured to generate a cut-off pattern of the light projected within the second field of view; and
  a controller in communication with the spot beam light source and configured to communicate pattern data thereto to set the cut-off pattern, wherein the pattern data represents one of a plurality of different predetermined cut-off patterns each representing a regulatory requirement associated with at least one of: different regulatory bodies, or different ones of a left-hand drive standard and a right-hand drive standard, and
  wherein the foreground light source and the spot beam light source are operable together in a low-beam mode to generate a combined low-beam projection pattern.

2. The headlight assembly of claim 1, wherein the spot beam light source includes at least 20,000 of the pixel light sources.

3. The headlight assembly of claim 1, wherein the second field of view has a width of about 21-degrees.

4. The headlight assembly of claim 1, wherein the controller includes a memory storing profile data representing the plurality of different predetermined cut-off patterns.

5. The headlight assembly of claim 1, wherein the controller is further configured to dynamically adjust a vertical position of the cut-off pattern.

6. The headlight assembly of claim 1, wherein the controller is further configured to cause the spot beam light source to project a graphical image onto a surface in front of the vehicle.

7. The headlight assembly of claim 1, further comprising a lens assembly overlying the spot beam light source and configured to project the light from the spot beam light source over the second field of view.

8. The headlight assembly of claim 7, wherein the lens assembly includes at least three lens elements.

9. The lighting system of claim 1, further comprising an adaptive driving beam (ADB) light source operable to generate an ADB projection pattern larger than the second field of view of the spot beam light source; and
wherein the ADB light source includes a plurality of ADB segments and is configured to selectively and independently reduce illumination in each of the ADB segments.

10. The lighting system of claim 9, wherein the ADB segments are each configured as one of: vertical bars which extend below and above a horizon, or as a matrix of ADB pixels arranged in a plurality of rows and a plurality of columns.

11. A headlight assembly for a vehicle, comprising:
a foreground light source configured to project light over a first field of view greater than 20-degrees wide;
a spot beam light source including a plurality of pixel light sources configured to project light over a second field of view smaller than the first field of view and overlapping the first field of view; and
an adaptive driving beam (ADB) light source operable to generate an ADB projection pattern larger than the second field of view of the spot beam light source;
wherein the foreground light source and the spot beam light source are operable together in a low-beam mode to generate a combined low-beam projection pattern; and
wherein the ADB light source includes a plurality of ADB segments and is configured to selectively and independently reduce illumination in each of the ADB segments.

12. The headlight assembly of claim 11, wherein the ADB segments are each configured as vertical bars that are aligned parallel and adjacent to one another and which extend below and above a horizon.

13. The headlight assembly of claim 11, wherein the ADB light source includes a matrix light source configured to generate the ADB segments as a matrix of ADB pixels arranged in a plurality of rows and a plurality of columns.

14. The headlight assembly of claim 11, wherein the spot beam light source is configured to generate a cut-off pattern of the light projected within the second field of view.

15. The headlight assembly of claim 14, further comprising a controller in communication with the spot beam light source and configured to communicate pattern data thereto to set the cut-off pattern, wherein the pattern data represents one of a plurality of different cut-off patterns each representing a different regulatory requirement.

16. A lighting system for a vehicle, comprising:
two headlight assemblies, with each of the headlight assemblies including:
a foreground light source configured to project light over a first field of view greater than 20-degrees wide; and
a spot beam light source including a plurality of pixel light sources configured to project light over a second field of view smaller than the first field of view and overlapping the first field of view; and
a controller in communication with the spot beam light sources in each of the two headlight assemblies and configured to communicate pattern data to each of the spot beam light sources for controlling a cut-off pattern of the light projected therefrom,
wherein the cut-off pattern is one of a plurality of different predetermined cut-off patterns each representing a regulatory requirement associated with at least one of: different regulatory bodies, or different ones of a left-hand drive standard and a right-hand drive standard; and
wherein the controller includes a memory storing profile data representing at least one of the plurality of different predetermined cut-off patterns.

17. The lighting system of claim 16, wherein the controller is further configured to dynamically adjust a vertical position of the cut-off pattern.

18. The lighting system of claim 16, wherein the controller is further configured to cause the spot beam light source to project a graphical image onto a surface in front of the vehicle.

19. The lighting system of claim 16, further comprising an adaptive driving beam (ADB) light source operable to generate an ADB projection pattern larger than the second field of view of the spot beam light source; and
wherein the ADB light source includes a plurality of ADB segments and is configured to selectively and independently reduce illumination in each of the ADB segments.

20. The lighting system of claim 19, wherein the ADB segments are each configured as one of: vertical bars which extend below and above a horizon, or as a matrix of ADB pixels arranged in a plurality of rows and a plurality of columns.

* * * * *